US012639564B2

(12) United States Patent
Rice et al.

(10) Patent No.: US 12,639,564 B2
(45) Date of Patent: May 26, 2026

(54) SYSTEM AND METHOD FOR ESTIMATING PERTURBATION NORM FOR THE SPECTRUM OF ROBUSTNESS

(71) Applicants: Robert Bosch GmbH, Stuttgart (DE); CARNEGIE MELLON UNIVERSITY, Pittsburgh, PA (US)

(72) Inventors: Leslie Rice, Pittsburgh, PA (US); Jeremy Kolter, Pittsburgh, PA (US); Wan-Yi Lin, Wexford, PA (US)

(73) Assignee: Robert Bosch GmbH; CARNEGIE MELLON UNIVERSITY, Pittsburgh, PA (US)

( * ) Notice: Subject to any disclaimer, the term of this patent is extended or adjusted under 35 U.S.C. 154(b) by 1276 days.

(21) Appl. No.: 17/487,619

(22) Filed: Sep. 28, 2021

(65) Prior Publication Data
US 2023/0100132 A1 Mar. 30, 2023

(51) Int. Cl.
*G06N 3/08* (2023.01)
*G06F 18/21* (2023.01)
*G06N 7/08* (2006.01)

(52) U.S. Cl.
CPC ............. *G06N 3/08* (2013.01); *G06F 18/217* (2023.01); *G06N 7/08* (2013.01)

(58) Field of Classification Search
CPC .................................. G06N 3/08; G06N 7/08
See application file for complete search history.

(56) References Cited

U.S. PATENT DOCUMENTS

| | | | |
|---|---|---|---|
| 11,687,777 B2 * | 6/2023 | Liu | G06V 10/82 |
| | | | 382/156 |
| 2020/0234110 A1 * | 7/2020 | Singh | G06N 3/04 |
| 2021/0089879 A1 * | 3/2021 | Shukla | G06V 10/764 |

OTHER PUBLICATIONS

"Lam et al., Random Perturbation and Bagging to Quantify Input Uncertainty, WSF" (Year: 2019).*
"Hendrycks et al., The Many Faces of Robustness: A Critical Analysis of Out-of-Distribution Generalization, CVF" (Year: 2021).*
"Afshar et al., Reflection, Refraction, and Hamiltonian Monte Carlo" (Year: 2015).*
Madry, A. et al., "Towards deep learning models resistant to adversarial attacks," downloaded from <arxiv.org/abs/1706.06083> (Sep. 4, 2019) 28 pp. (Year: 2019).*
Wang, H. et al., "A hamiltonian monte carlo method for probabilistic adversarial attack and learning," downloaded from <arxiv.org/abs/2010.07849> (Oct. 15, 2020) 13 pp. (Year: 2020).*
Hendrycks et al., "The Many Faces of Robustness: A Critical Analysis of Out-of-Distribution Generalization", arXiv:2006.16241v3 [cs.CV] Jul. 24, 2021, 18 pages.
Afshar et al., "Reflection, Refraction, and Hamiltonian Monte Carlo", 9 pages.

* cited by examiner

*Primary Examiner* — Brian M Smith
(74) *Attorney, Agent, or Firm* — Dickinson Wright PLLC

(57) ABSTRACT

A computer-program product storing instructions which, when executed by a computer, cause the computer to, for one or more iterations, update parameters associated with a machine-learning network utilizing perturbations for input data, wherein the perturbations are sampled utilizing Markov chain Monte Carlo, identify a loss value associated with each perturbation in each iteration, and evaluate the machine learning network by identifying an average loss value across each iteration and outputting the average loss value.

19 Claims, 9 Drawing Sheets

200

202

204

220 — I/O

206

CPU

HMI — 218

222 — Network

Display — 232

Memory

208

ML Model — 210

Training Data — 212

Raw Source — 216

230

224

*300*

301 — Receive Input

303 — Initiate Random Perturbation

305 — Increase Stress

307 — Repeat M Times

309 — Return Loss Function

311 — Compute Loss Value Over Samples

*500*

*600*

*1100*

*506* Sensor

*508*

*502* Control System

*510*

*1102* Display

SYSTEM AND METHOD FOR ESTIMATING PERTURBATION NORM FOR THE SPECTRUM OF ROBUSTNESS

TECHNICAL FIELD

The present disclosure relates to a system and method associated with a machine learning network. The disclosure may relate to augmentation and processing of an image (or other inputs) utilizing machine learning.

BACKGROUND

While deep neural networks continue to display good performance in domains including computer vision and natural language processing, deep neural networks have been increasingly shown to be lacking robustness.

Equipping an AI system to be robust to perturbations to its expected input (e.g. adversarial perturbations, natural perturbations) comes at a cost of reduced performance on its expected input (clean performance). The system may define expected input as the set and/or distribution of inputs on which the classifier is expected to operate (e.g. an AI system trained to operate in daylight in highway operating in daylight conditions in a highway)—the system may name the measured performance of the AI in this task as clean performance. Perturbations to the expected input can come from multiple sources, from which the system can highlight adversarial (e.g. perturbations to the input coming from an adversarial source that might have full access to the information about the classifier architecture and internal parameters), and natural (e.g. perturbations to the input coming from a natural source that could have been unaccounted for during the process of design and training the AI system such as sun glares, snow, fog, or other natural occurring conditions that would affect the distribution of inputs). The set of perturbations being considered for training and/or evaluation is denoted as perturbation set or threat model.

In addition the perturbation set, one should also consider the level of adversary of the perturbation: the two extreme of adversary is random perturbation (not adversarial) and worst-case (adversarial) perturbation. One need to consider a more fine-grained spectrum of robustness definitions, which naturally interpolates between both these two extremes.

To evaluate a model's robustness and train a robust model, it may be important to determine how well the classifier performs not just on the target domain it was trained upon, but upon perturbed examples. In these settings, tit may be on two extremes of robustness: the robustness to perturbations drawn at random from within some distribution (e.g., robustness to random perturbations), and the robustness to the worst case perturbation in some set (e.g., adversarial robustness).

SUMMARY

According to a first embodiment, a computer-implemented method for training a neural network includes receiving a set of data from one or more sensors, initializing a random perturbation sample associated with the set of data, computing a loss value associated with the random perturbation sample associated with the set of data, determining a gradient of the loss value associated with one or more parameters of the neural network, updating the one or more parameters utilizing the gradient, and outputting a trained neural network utilizing the updated parameters and upon convergence to a first threshold.

According to a second embodiment, a system includes a machine-learning network that includes an input interface configured to receive input data from a sensor, wherein the sensor includes a camera, a radar, a sonar, or a microphone. The system also includes a processor, in communication with the input interface, wherein the processor is programmed to receive the input data, wherein the input data is indicative of image, radar, sonar, or sound information, initiates a random perturbation sample associated with the input data, increase a level of perturbation stress for the random perturbation sample, compute a loss value associated with the random perturbation sample, determine a gradient of the loss value associated with one or more parameters of the neural network, updates the one or more parameters utilizing the gradient, and output a trained neural network utilizing updated parameters and upon convergence to a first threshold.

According to a third embodiment, a computer-program product storing instructions which, when executed by a computer, causes the computer to, for one or more iterations, update parameters associated with a machine-learning network utilizing perturbations for input data, wherein perturbations are sampled utilizing Markov chain Monte Carlo, identify a loss value associated with each perturbation in each iteration, and evaluate the machine learning network by identifying an average loss value across each iteration and outputting the average loss value.

DETAILED DESCRIPTION

Figure 1:
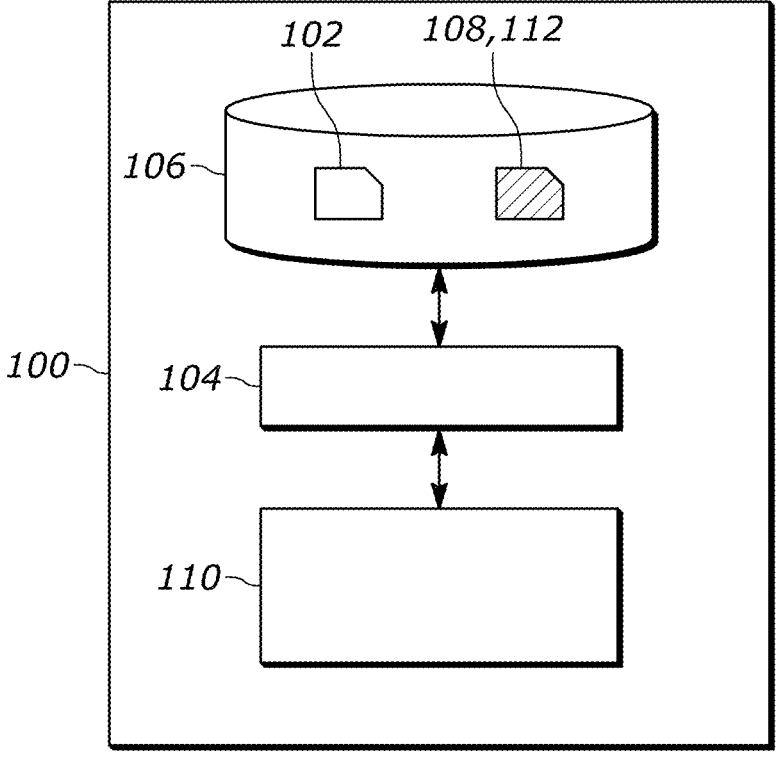
FIG. 1 shows a system 100 for training a neural network.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

There has been an increasing focus in recent years in evaluating the robustness of machine learning classifiers, broadly interpreted as evaluating performance on not just on a test set, but also evaluating the performance relative to some additional (possibly domain-specific) uncertainty or bounds on the problems. Although there are many formal definitions of robustness, most work in this area has focused on two particular settings. In the "classical" sense of robustness, one can consider evaluating the classifier in terms of its worst-case loss under some perturbation set applied to the inputs, e.g., the system and method could evaluate (via finite sample approximation):

$$E_{x,y \sim D}[\max_{\delta \in \Delta(x)} l(h(x+\delta),y)]$$

where D denotes a distribution over x; y pairs, h denotes the hypothesis function, l denotes a loss, and $\Delta(x)$ denotes some (input-dependent) uncertainty region. This formulation, for instance, underlies adversarial examples and also motivates the classical adversarial training approaches. However, in evaluating the setting of robustness to random perturbations, e.g., evaluating a classifier via the loss $$E_{\{x,y \sim D\}}[E_{\delta \sim P(x)} l(h(x+\delta),y)]$$

where now P(x) denotes some (again, input-dependent) distribution over possible perturbations. This formulation underlies common data augmentation strategies in deep learning, as well as most formulations of "natural" robustness.

There may be a natural spectrum between the notions of adversarial robustness and robustness to random perturbations. Specifically, both these notions can be expressed as function $l_p$ norms over the perturbation space. The definition may utilize the following functional norm:

$$\|f\|_{\mu,p} = (\int |f(x)|^p d\mu(x))^{(1/p)},$$

Where f is a function, $\mu$ is density where $\int \mu = 1$ and $\|f\|_{\mu,p}$ is the p-norm under density $\mu$ The system may then define the intermediate-p robustness loss:

$$E_{x,y \sim D}[\|l(h(x+\delta),y)\|_{\mu,p}], \tag{Formula 1}$$

With which worst-case (adversarial) loss actually arises more specifically when p=1 and $\mu$ is a uniform distribution over some norm ball (unrelated to the norm p). When the system has $1 < p < \infty$, it may enable a full spectrum of robustness measurements, which may be referred to as intermediate-p robustness, that evaluates the performance of classifiers in a wide range in between these two extreme cases.

Note that random perturbation loss corresponds to loss on random samples from $\mu$ when p=1.

The formulation (1) usually cannot be computed exactly, hence the system may utilize the following Markov chain Monte Carlo (MCMC) path method to estimate (Formula 1):

Let $(\theta_1, \theta_2, \ldots, \theta_m\}$ be m scalars corresponding to linearly interpolated values from 0 to p. For i=1, ... m, sample $\delta_1$ from the following unnormalized density:

$$\delta_i \sim p(\delta|\theta_i), \text{ where } p(\delta|\theta) \propto l((x+\delta),y)^\theta \mu(\delta)$$

Then the following estimator, given by the geometric mean of the resulting samples:

$$Z_{path} = \left(\prod_{i=1}^m l((x+\delta_i), y)\right)^{(1/m)}$$

may be a consistent estimator of our integral Z as in (Formula 1). Practically, the m samples can be drawn using MCMC.

The system may allow the ability to approximate the desired integral just through the ability to sample from the distribution $p(\delta | \theta)$. While this is still a challenging task, sampling from unnormalized probability distributions known, and the system can apply MCMC sampling methods to this task. Further, while the sampling of $(\delta^{(i)}, \theta^{(i)})$ can be done in different ways, the system may choose to linearly anneal $\theta^{(i)}$ from 0 to p, and then draw $\delta^{(i)} \sim \tilde{p}(\delta | \theta)$ using some MCMC sampler. Thus, it may start with sampling from an "easy" distribution (when $\theta = 0$, the distribution over $\delta$ is simply given by $\mu$), and gradually anneals to a more peaked distribution as $\theta$ increases. The resulting algorithm for evaluating a network using this geometric mean estimator is shown below.

In order to generate the samples for the path sampling estimation from the desired distribution $(\delta, \theta)$, the system may use Markov chain Monte Carlo (MCMC) methods to sample $\delta$ from the unnormalized distribution $\tilde{p}(\delta | \theta)$. When the loss is a differentiable function of the perturbation distribution, the system can take advantage of gradient-based methods to reduce random walk behavior in MCMC sampling and achieve more efficient sampling. Hamiltonian Monte Carlo (HMC) is one such gradient-based MCMC method that simulates Hamiltonian dynamics to improve sample efficiency in high-dimensional spaces. HMC is based on the Hamiltonian function H(q, p)=U(q)+K(p), where q is a d-dimensional position vector, p is a d-dimensional momentum vector, U(q) is the potential energy, and K(p) is the kinetic energy. To translate this to our setting, $U(\delta) = \log (C(x+\delta), y)^\theta \mu(\delta))$ is just the negative log probability density of the distribution we want to sample from, and $K(p) = p^2 / (2\sigma^2)$ is the negative log probability density of the zero-mean Gaussian distribution with variance $\sigma^2$.

The disclosure below may include an embodiment that has an estimator to evaluate intermediate-p robustness for any p. Furthermore, it may include utilizing loss function to train a robust model. Given a machine learning model h parameterized by $\varphi$, data for training $D_{train}$, data for evaluation $D_{eval}$, corresponding loss function l, and norm order ip:

For evaluating intermediate-p robustness, the system may, for each sample (x,y) in $D_{eval}$, compute loss value as calculating intermediate-p loss given data point (x,y) (shown below). The system may then average loss value over all samples in $D_{eval}$. For training a system and method utilizing a network, for each sample (x,y) in $D_{train}$, the system and method may compute loss value as calculating intermediate-p loss given data point (x,y) below. The system may compute gradient of the loss over φ and then update φ with the gradient obtained above. This update can use any existing machine learning optimizers. The system may repeat the steps over $D_{train}$ for K times.

FIG. 1 shows a system 100 for training a neural network. The system 100 may comprise an input interface for accessing training data 192 for the neural network. For example, as illustrated in FIG. 1, the input interface may be constituted by a data storage interface 180 which may access the training data 192 from a data storage 190. For example, the data storage interface 180 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 190 may be an internal data storage of the system 100, such as a hard drive or SSD, but also an external data storage, e.g., a network-accessible data storage.

In some embodiments, the data storage 190 may further comprise a data representation 194 of an untrained version of the neural network which may be accessed by the system 100 from the data storage 190. It will be appreciated, however, that the training data 192 and the data representation 194 of the untrained neural network may also each be accessed from a different data storage, e.g., via a different subsystem of the data storage interface 180. Each subsystem may be of a type as is described above for the data storage interface 180. In other embodiments, the data representation 194 of the untrained neural network may be internally generated by the system 100 on the basis of design parameters for the neural network, and therefore may not explicitly be stored on the data storage 190. The system 100 may further comprise a processor subsystem 160 which may be configured to, during operation of the system 100, provide an iterative function as a substitute for a stack of layers of the neural network to be trained. Here, respective layers of the stack of layers being substituted may have mutually shared weights and may receive, as input, an output of a previous layer, or for a first layer of the stack of layers, an initial activation, and a part of the input of the stack of layers. The processor subsystem 160 may be further configured to iteratively train the neural network using the training data 192. Here, an iteration of the training by the processor subsystem 160 may comprise a forward propagation part and a backward propagation part. The processor subsystem 160 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 196 of the trained neural network, this data may also be referred to as trained model data 196. For example, as also illustrated in FIG. 1, the output interface may be constituted by the data storage interface 180, with said interface being in these embodiments an input/output ("IO") interface, via which the trained model data 196 may be stored in the data storage 190. For example, the data representation 194 defining the 'untrained' neural network may during or after the training be replaced, at least in part by the data representation 196 of the trained neural network, in that the parameters of the neural network, such as weights, hyperparameters and other types of parameters of neural networks, may be adapted to reflect the training on the training data 192. This is also illustrated in FIG. 1 by the reference numerals 194, 196 referring to the same data record on the data storage 190. In other embodiments, the data representation 196 may be stored separately from the data representation 194 defining the 'untrained' neural network. In some embodiments, the output interface may be separate from the data storage interface 180, but may in general be of a type as described above for the data storage interface 180.

Figure 2:
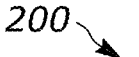
FIG. 2 shows a computer-implemented method 200 for training a neural network.

FIG. 2 depicts a data annotation system 200 to implement a system for annotating data. The data annotation system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction stet such as one of the x86, ARM, Power, or MIPS instruction set families. During operation, the CPU 206 may execute stored program instructions that are retrieved from the memory unit 208. The stored program instructions may include software that controls operation of the CPU 206 to perform the operation described herein. In some examples, the processor 204 may be a system on a chip (SoC) that integrates functionality of the CPU 206, the memory unit 208, a network interface, and input/output interfaces into a single integrated device. The computing system 202 may implement an operating system for managing various aspects of the operation.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 or algorithm, a training dataset 212 for the machine-learning model 210, raw source dataset 215.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 330 may be in communication with the external network 224.

The computing system 202 may include an input/output (I/O) interface 220 that may be configured to provide digital and/or analog inputs and outputs. The I/O interface 220 may include additional serial interfaces for communicating with external devices (e.g., Universal Serial Bus (USB) interface).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning algorithm 210 that is configured to analyze the raw source dataset 215. The raw source dataset 215 may include raw or unprocessed sensor data that may be representative of an input dataset for a machine-learning system. The raw source dataset 215 may include video, video segments, images, text-based information, and raw or partially processed sensor data (e.g., radar map of objects). In some examples, the machine-learning algorithm 210 may be a neural network algorithm that is designed to perform a predetermined function. For example, the neural network algorithm may be configured in automotive applications to identify pedestrians in video images.

The computer system 200 may store a training dataset 212 for the machine-learning algorithm 210. The training dataset 212 may represent a set of previously constructed data for training the machine-learning algorithm 210. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process. In this example, the training dataset 212 may include source videos with and without pedestrians and corresponding presence and location information. The source videos may include various scenarios in which pedestrians are identified.

The machine-learning algorithm 210 may be operated in a learning mode using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 can compare output results (e.g., annotations) with those included in the training dataset 212. Since the training dataset 212 includes the expected results, the machine-learning algorithm 210 can determine when performance is acceptable. After the machine-learning algorithm 210 achieves a predetermined performance level (e.g., 100% agreement with the outcomes associated with the training dataset 212), the machine-learning algorithm 210 may be executed using data that is not in the training dataset 212. The trained machine-learning algorithm 210 may be applied to new datasets to generate annotated data.

The machine-learning algorithm 210 may be configured to identify a particular feature in the raw source data 215. The raw source data 215 may include a plurality of instances or input dataset for which annotation results are desired. For example, the machine-learning algorithm 210 may be configured to identify the presence of a pedestrian in video images and annotate the occurrences. The machine-learning algorithm 210 may be programmed to process the raw source data 215 to identify the presence of the particular features. The machine-learning algorithm 210 may be configured to identify a feature in the raw source data 215 as a predetermined feature (e.g., pedestrian). The raw source data 215 may be derived from a variety of sources. For example, the raw source data 215 may be actual input data collected by a machine-learning system. The raw source data 215 may be machine generated for testing the system. As an example, the raw source data 215 may include raw video images from a camera.

In the example, the machine-learning algorithm 210 may process raw source data 215 and output an indication of a representation of an image. The output may also include augmented representation of the image. A machine-learning algorithm 210 may generate a confidence level or factor for each output generated. For example, a confidence value that exceeds a predetermined high-confidence threshold may indicate that the machine-learning algorithm 210 is confident that the identified feature corresponds to the particular feature. A confidence value that is less than a low-confidence threshold may indicate that the machine-learning algorithm 210 has some uncertainty that the particular feature is present.

Figure 3:
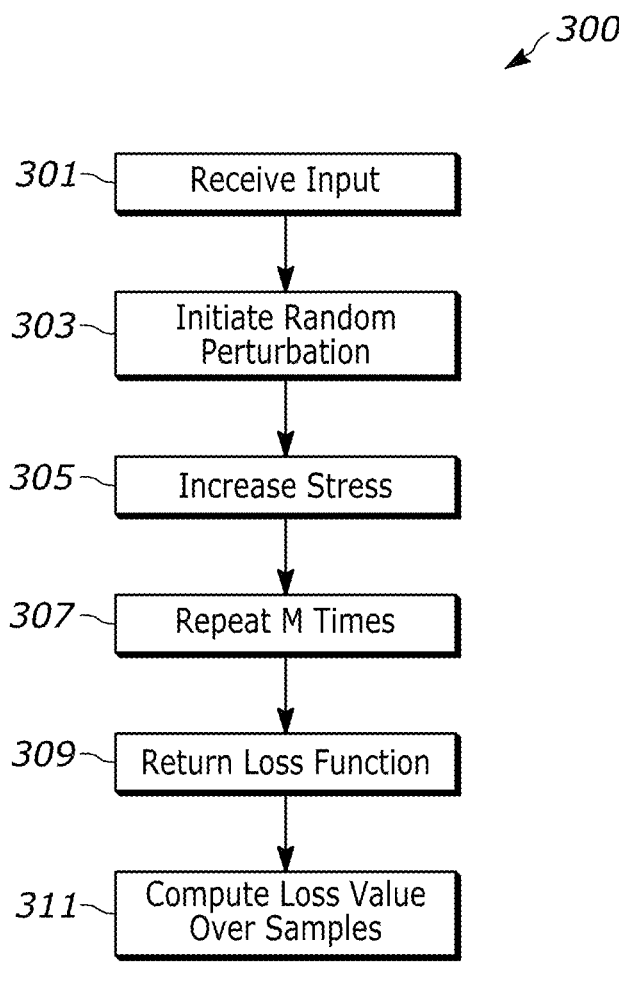
FIG. 3 illustrates a flow chart for identifying intermediate perturbation loss for a given data point.

FIG. 3 discloses an illustrative flow chart 300 for identifying intermediate perturbation loss for a given data point. Calculating the length or magnitude of vectors may often be required either directly as a regularization method in machine learning, or as part of broader vector or matrix operations. In general, The L1 norm may be calculated as the sum of the absolute values of the vector. The L2 norm may be calculated as the square root of the sum of the squared vector values. The max norm may be calculated as the maximum vector values. The length of a perturbation maybe a perturbation norm.

During an evaluation period, the system may evaluate the intermediate perturbation robustness. For each sample of input data and associated classification (x,y) during evaluation of data, the system may compute the loss value as calculating intermediate-p loss given data point (x,y). The system and method may then sample the average loss value over all samples in evaluation of data.

At step 301, the system may receive input data from one or more sensors. The input data may include time-series data or various images, videos, sound, etc. At step 303, the system may sample a random perturbation. Thus, the system may iniatlize a perturbation randomly for a sample. Next, the system may run a plurality of iterations for the steps detailed below. At step 305, the system may increase the level of perturbation stress as applied to the perturbation. Thus, each iteration and sample, the system may increase the perturbation for a given sample. At step 307, the system may repeat this M times (as disclosed in the formula above) utilizing random perturbation samples. The perturbation samples may be selected utilizing an MCMC algorithm. At step 309, the system may return a loss function associated with all samples of the perturbation. At step 311, the system may multiple the loss value over all samples of the perturbation utilizing the geometry average. The system may then be configured to output that loss value average or a score associated with the loss value average. The system may then evaluate the robustness of the network by computing the loss value for each sample of data via calculating the intermediate-p loss given each data point. The system may then average the loss value over all samples in the evaluation data.

Figure 4:
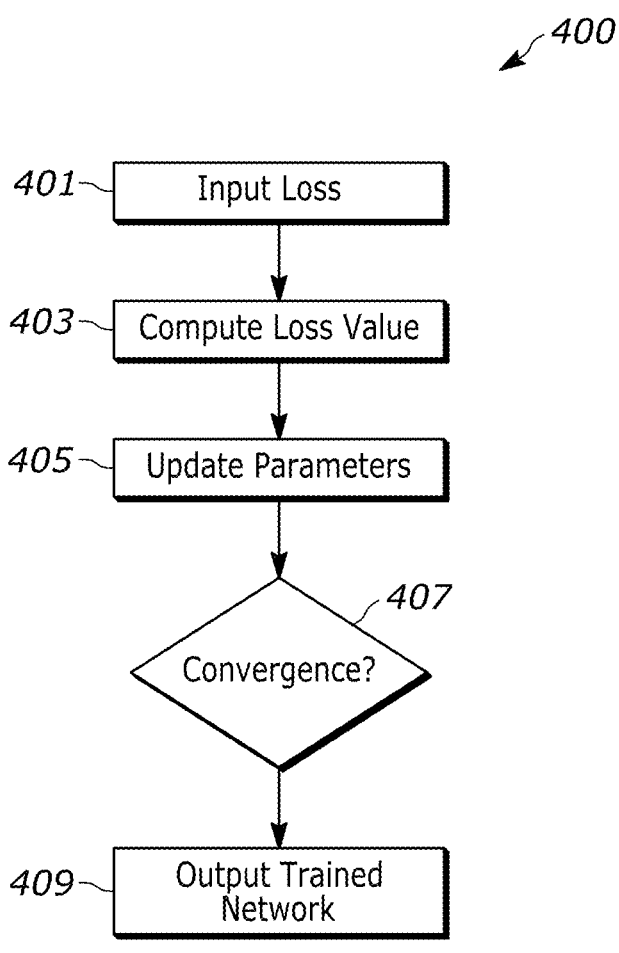
FIG. 4 illustrates a flow chart for training a network utilizing the sampled perturbations.

FIG. 4 illustrates a flow chart 400 for training a network utilizing the sampled perturbations. At step 401, the system and method may, for each sample (x,y) in the data set, compute a loss value calculating an intermediate-p loss given the data point (x.y). Thus for training, the system may sample of input data and associated classification (x,y) during training of data. At step 403, the system may compute the loss value as calculating intermediate-p loss given a data point (x,y). The system and method may then compute the gradient of the loss over the given parameter. The system may update the parameter with the gradient obtained when the gradient of the loss over the given parameter is calculated. The update can be used in any existing machine learning optimizers. The system may then repeat this training of the data for K times. Thus, the system may determine if convergence is met at step 407. If convergence in not met, the system may run another iteration for another perturbed sample to determine a loss value at step 403. The system may determine that convergence is met based on a threshold or another attribute. For example, the threshold utilized for convergence may be met by a defined number of iterations, an amount of error loss, the amount of error classification, loss value (e.g., average or sum), or other attributes. When convergence is met, the system may output trained network at step 409. The perturbation data may be utilized as an input to a neural network and utilized to train that neural network at step 409. Thus, the neural network may be trained to identify a classification of perturbation data. Real world perturbations (as well as those simulated) may refer to any adversarial data to the network, such as different lighting conditions for an image or a different angle of an image that is taken, or any other adversarial input.

For larger values of p, the path sampling estimator may help to obtain good estimates of the training objective in this case, as random sampling will be much less likely to come across regions of the perturbation distribution with high loss. Path sampling, on the other hand, draws samples from the unnormalized loss distribution using MCMC, and so with increased p, there will be higher weighting on samples that induce higher loss. The Hamiltonian Monte Carlo method has the additional benefit of following the gradient (along with some noise), and so for larger p, even with a small number of iterations, path sampling can have advantages over random sampling during training.

Figure 5:
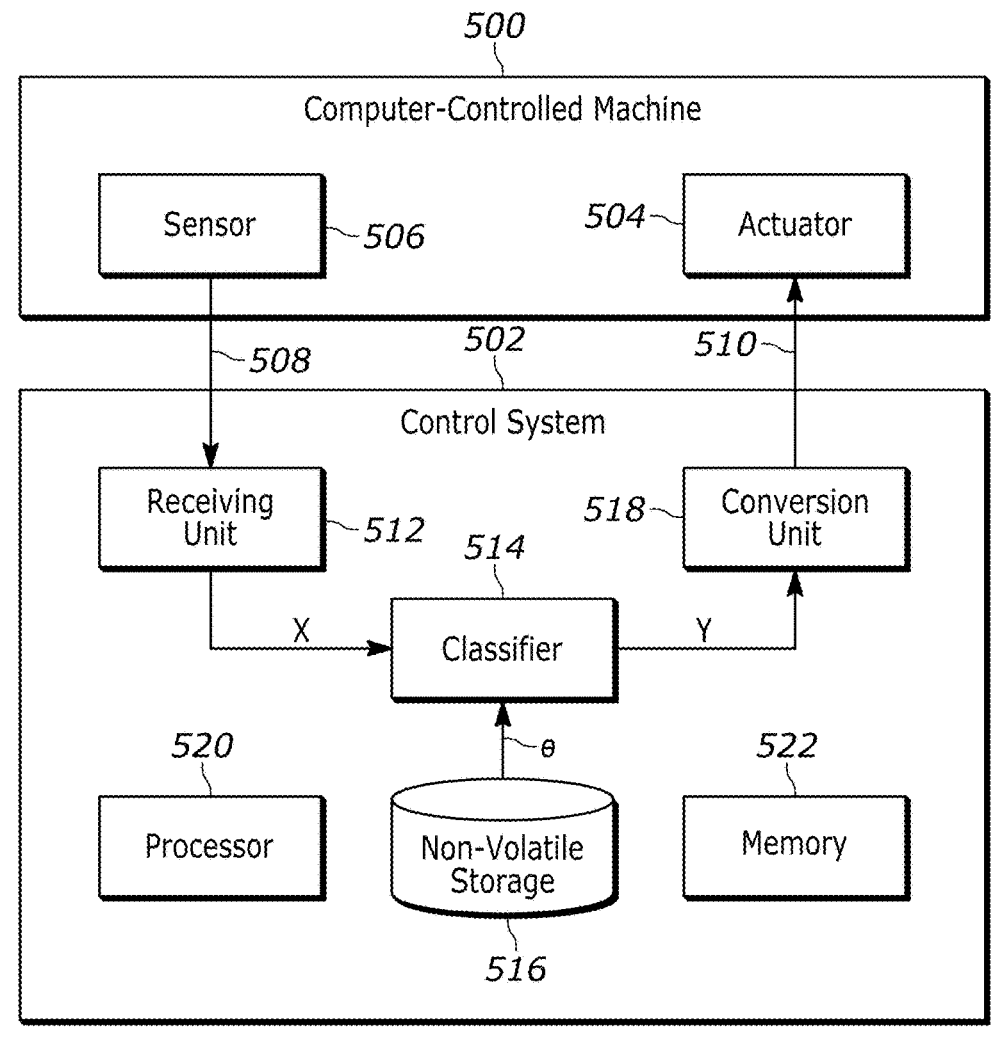
FIG. 5 depicts a schematic diagram of an interaction between computer-controlled machine 10 and control system 12.

FIG. 5 depicts a schematic diagram of an interaction between computer-controlled machine 500 and control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include video, radar, LiDAR, ultrasonic and motion sensors. In one embodiment, sensor 506 is an optical sensor configured to sense optical images of an environment proximate to computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to product each input signal x. Input signal x may include data corresponding to an image recorded by sensor 506.

Control system 502 includes classifier 514. Classifier 514 may be configured to classify input signals x into one or more labels using a machine learning (ML) algorithm, such as a neural network described above. Classifier 514 is configured to be parametrized by parameters, such as those described above (e.g., parameter θ). Parameters θ may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In another embodiment, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In another embodiment, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., ML algorithms) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more ML algorithms and/or methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 520, the computer-executable instructions of non-volatile storage 516 may cause control system 502 to implement one or more of the ML algorithms and/or methodologies as disclosed herein. Non-volatile storage 516 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
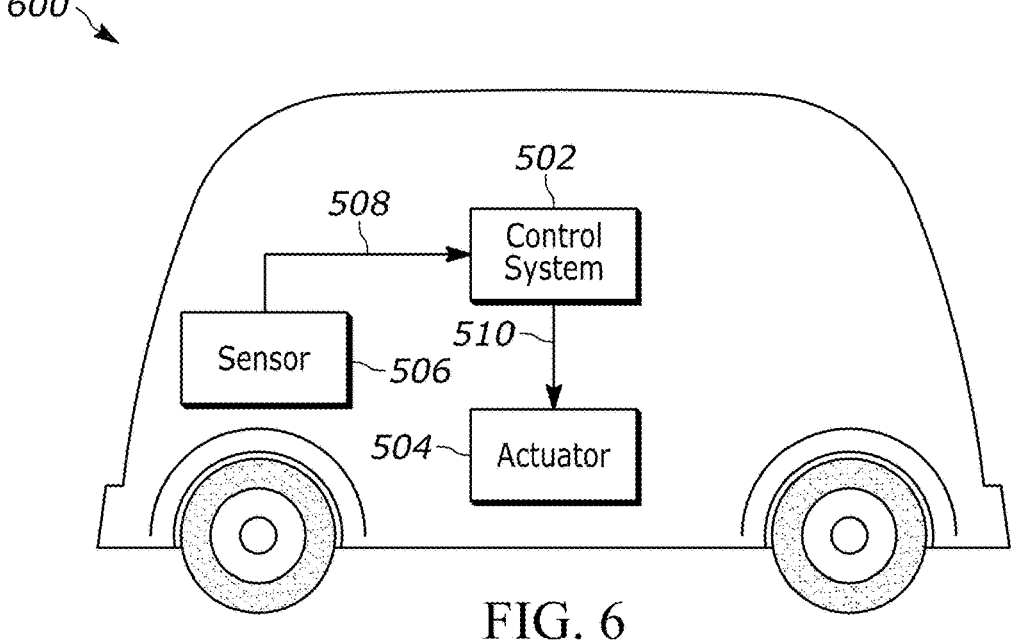
FIG. 6 depicts a schematic diagram of the control system of FIG. 1 configured to control a vehicle, which may be a partially autonomous vehicle or a partially autonomous robot.

FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. Alternatively or in addition to one or more specific sensors identified above, sensor 506 may include a software module configured to, upon execution, determine a state of actuator 504. One non-limiting example of a software module includes a weather information software module configured to determine a present or future state of the weather proximate vehicle 600 or other location.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects.

In embodiments where vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In other embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In another embodiment, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
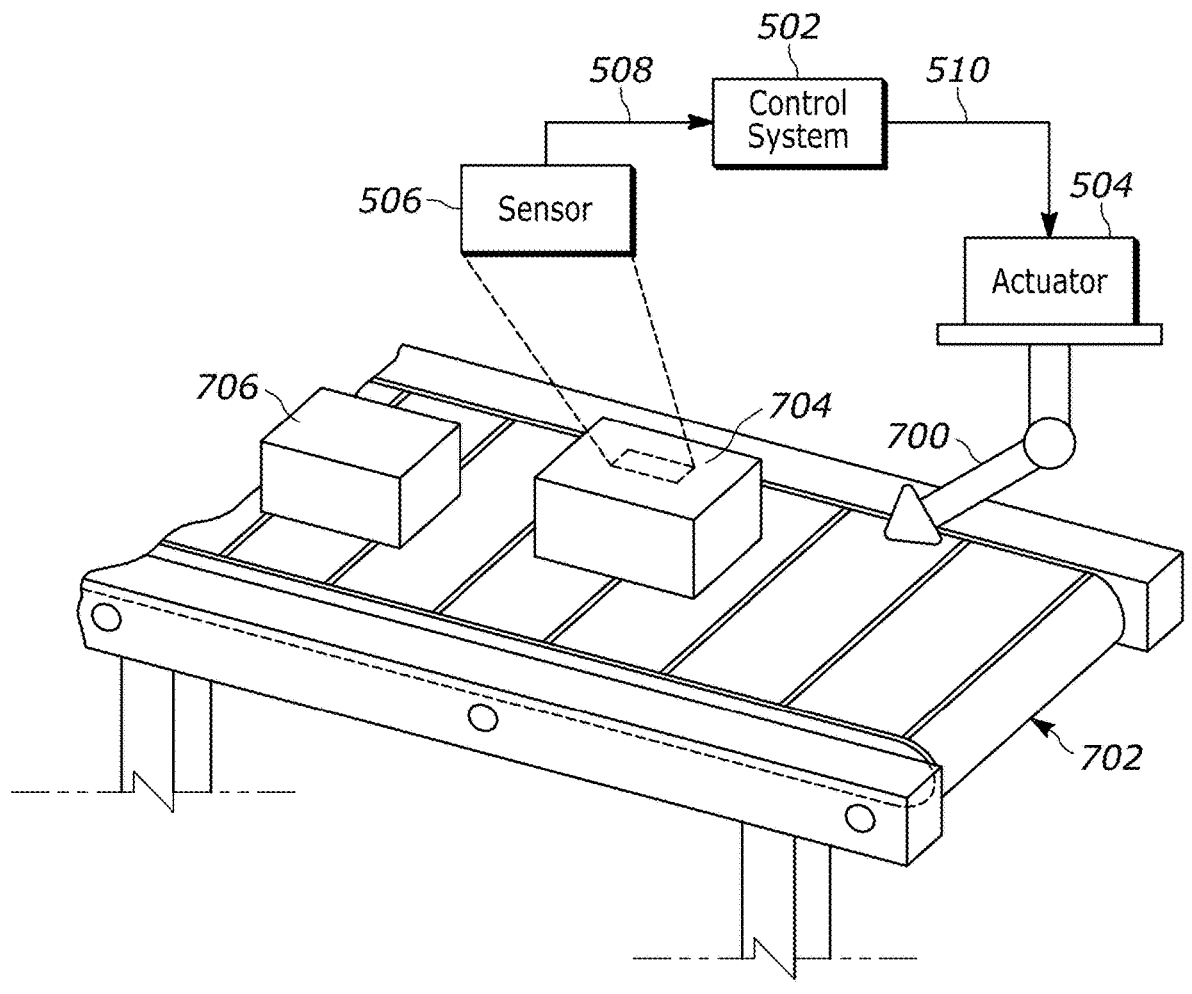
FIG. 7 depicts a schematic diagram of the control system of FIG. 1 configured to control a manufacturing machine, such as a punch cutter, a cutter or a gun drill, of manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704. The actuator 504 may be configured to control functions of system 700 (e.g., manufacturing machine) on subsequent manufactured product 106 of system 700 (e.g., manufacturing machine) depending on the determined state of manufactured product 704.

Figure 8:
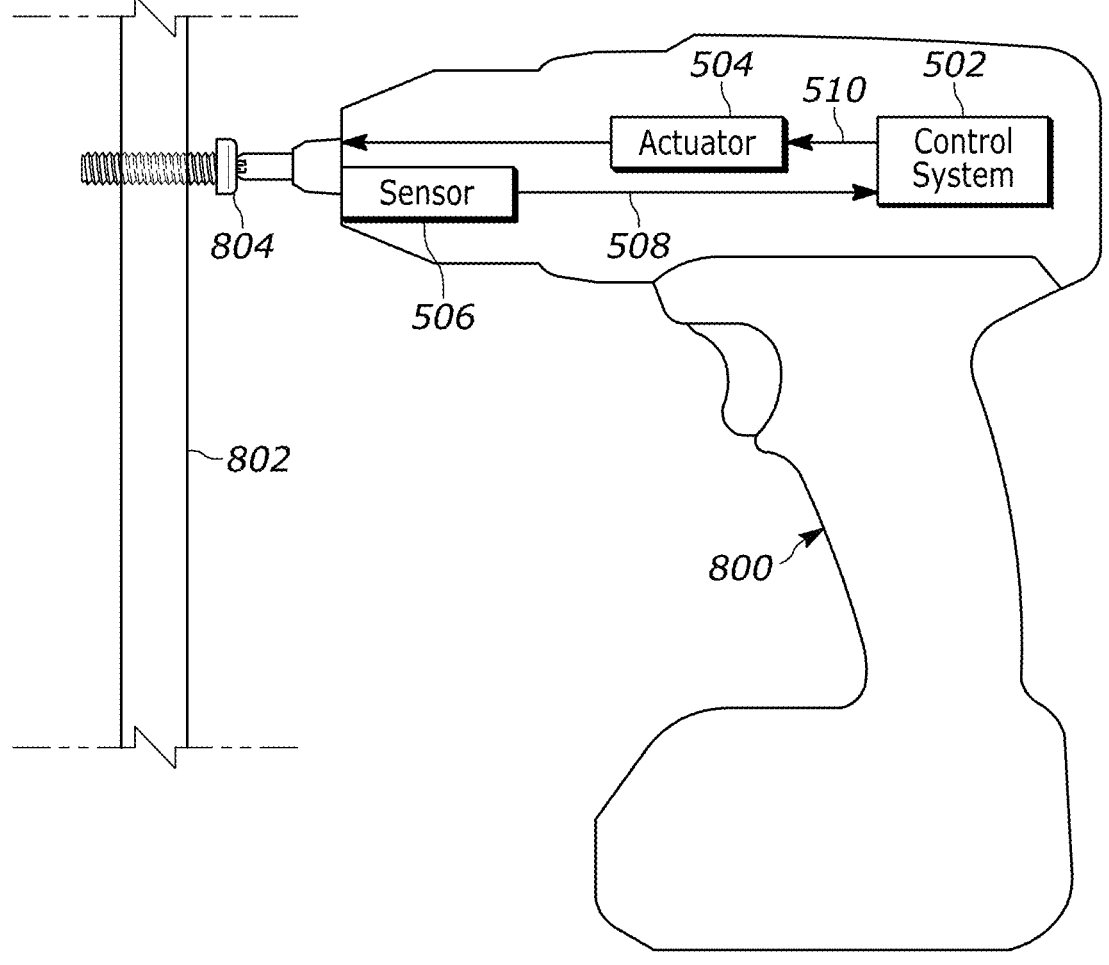
FIG. 8 depicts a schematic diagram of the control system of FIG. 1 configured to control a power tool, such as a power drill or driver, that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figure 9:
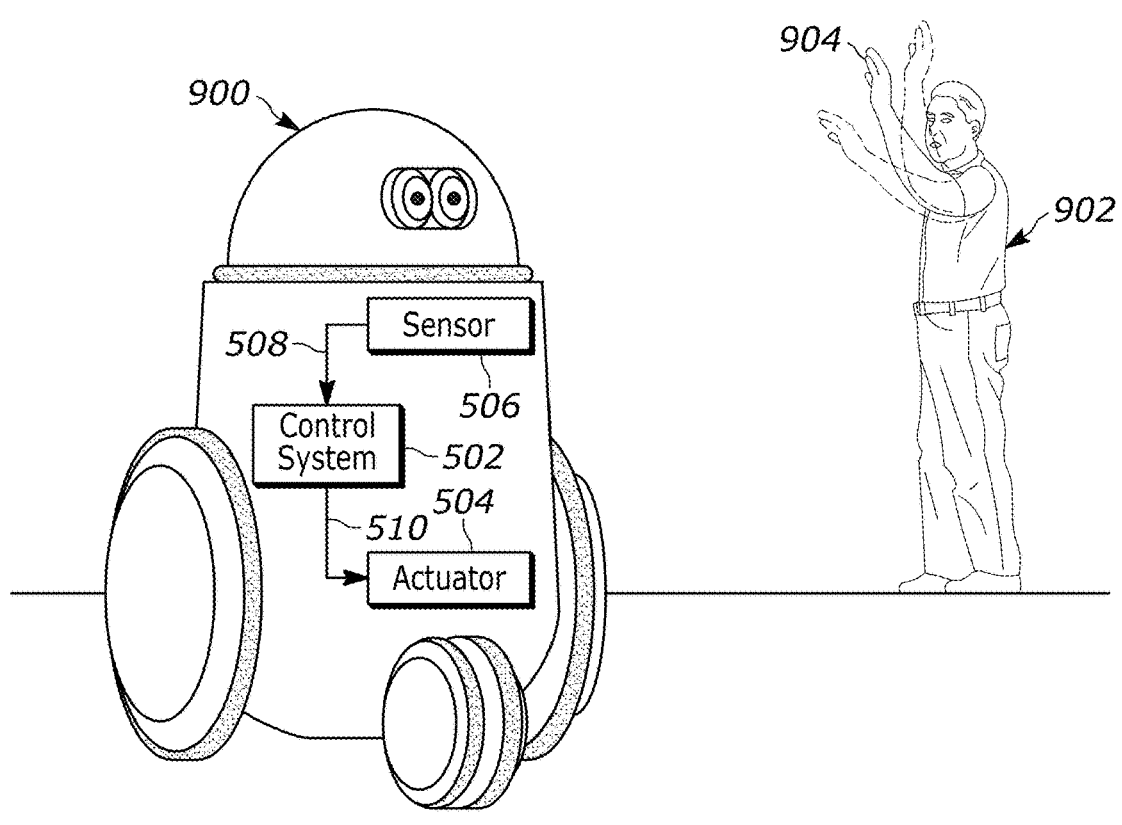
FIG. 9 depicts a schematic diagram of the control system of FIG. 1 configured to control an automated personal assistant.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

Figure 10:
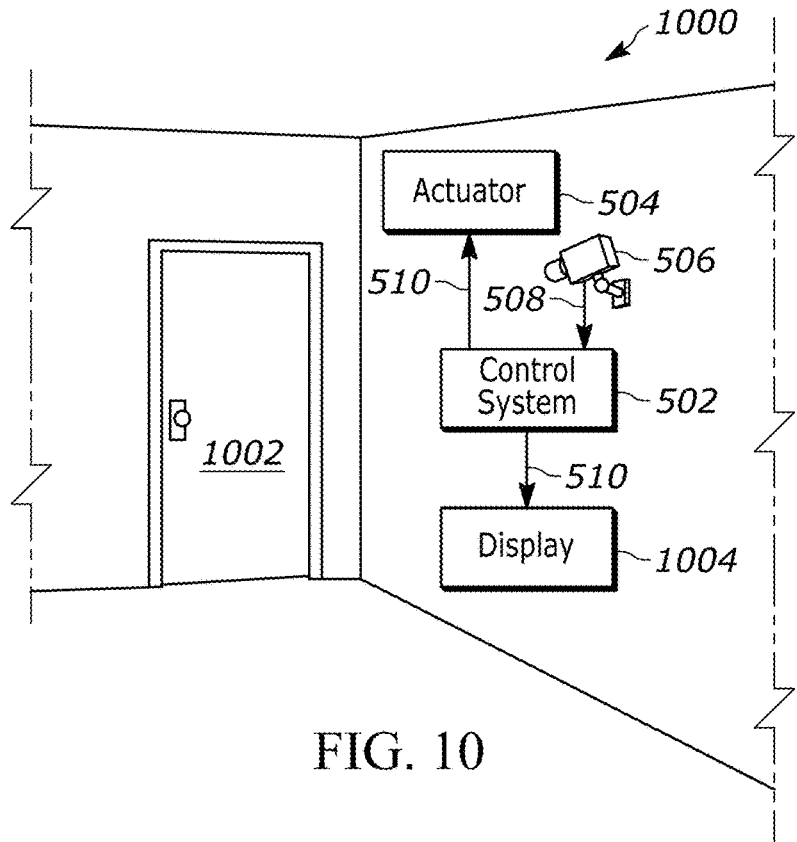
FIG. 10 depicts a schematic diagram of the control system of FIG. 1 configured to control a monitoring system, such as a control access system or a surveillance system.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In other embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may identify adversarial perturbations or random perturbations (e.g., bad shadows or lighting) in the video of the environment.

Figure 11:
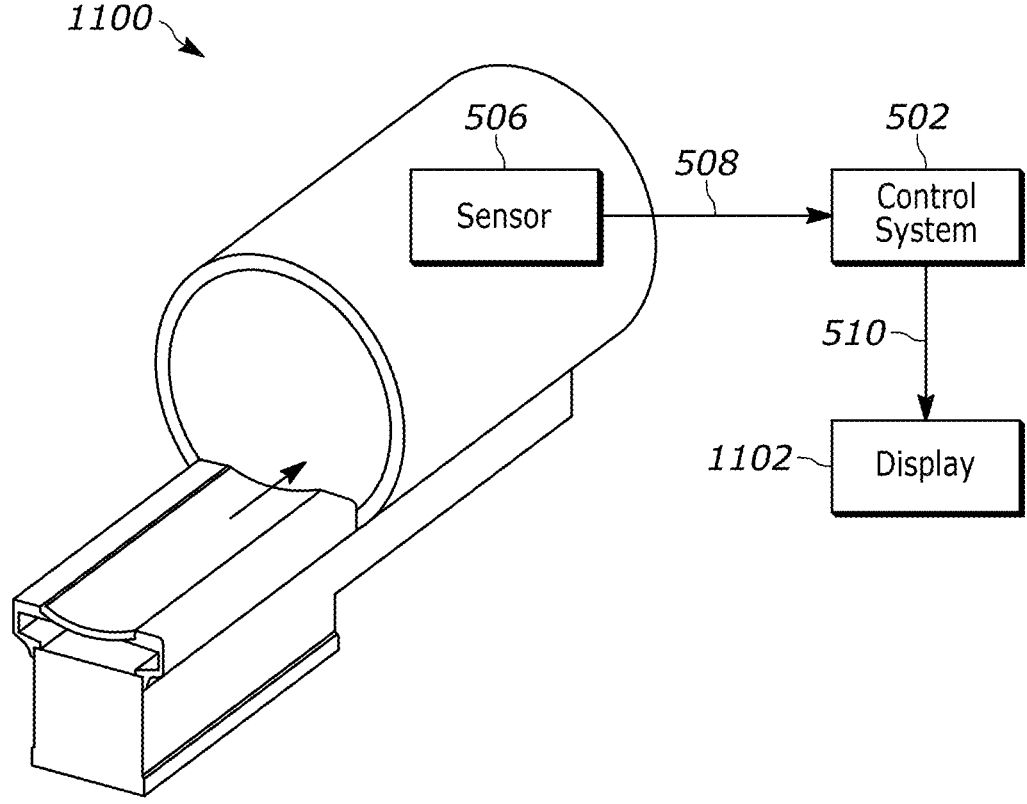
FIG. 11 depicts a schematic diagram of the control system of FIG. 1 configured to control an imaging system, for example an MRI apparatus, x-ray imaging apparatus or ultrasonic apparatus.

FIG. 11 depicts a schematic diagram of control system 502 configured to control imaging system 1100, for example an MRI apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 302 to display the imaging and highlighting the potentially anomalous region.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

FIG. 6 depicts a schematic diagram of control system 12 configured to control vehicle 50, which may be an at least partially autonomous vehicle or an at least partially autonomous robot. As shown in FIG. 5, vehicle 50 includes actuator 14 and sensor 16. Sensor 16 may include one or more video sensors, radar sensors, ultrasonic sensors, LiDAR sensors, and/or position sensors (e.g. GPS). One or more of the one or more specific sensors may be integrated into vehicle 50. Alternatively or in addition to one or more specific sensors identified above, sensor 16 may include a software module configured to, upon execution, determine a state of actuator 14. One non-limiting example of a software module includes a weather information software module configured to determine a present state of the weather proximate vehicle 50 or other location.

Classifier 24 of control system 12 of vehicle 50 may be configured to detect objects in the vicinity of vehicle 50 dependent on input signals x. In such an embodiment, output signal y may include information characterizing the vicinity of objects to vehicle 50. Actuator control command 20 may be determined in accordance with this information. The actuator control command 20 may be used to avoid collisions with the detected objects.

In embodiments where vehicle 50 is an at least partially autonomous vehicle, actuator 14 may be embodied in a brake, a propulsion system, an engine, a drivetrain, or a steering of vehicle 50. Actuator control commands 20 may be determined such that actuator 14 is controlled such that vehicle 50 avoids collisions with detected objects. Detected objects may also be classified according to what classifier 24 deems them most likely to be, such as pedestrians or trees. The actuator control commands 20 may be determined depending on the classification. In a scenario where an adversarial attack may occur, the system described above may be further trained to better detect objects or identify a change in lighting conditions or an angle for a sensor or camera on vehicle 50.

In other embodiments where vehicle 50 is an at least partially autonomous robot, vehicle 50 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 20 may be determined such that a propulsion unit, steering unit and/or brake unit of the mobile robot may be controlled such that the mobile robot may avoid collisions with identified objects.

In another embodiment, vehicle 50 is an at least partially autonomous robot in the form of a gardening robot. In such embodiment, vehicle 50 may use an optical sensor as sensor 16 to determine a state of plants in an environment proximate vehicle 50. Actuator 14 may be a nozzle configured to spray chemicals. Depending on an identified species and/or an identified state of the plants, actuator control command 20 may be determined to cause actuator 14 to spray the plants with a suitable quantity of suitable chemicals.

Vehicle 50 may be an at least partially autonomous robot in the form of a domestic appliance. Non-limiting examples of domestic appliances include a washing machine, a stove, an oven, a microwave, or a dishwasher. In such a vehicle 50, sensor 16 may be an optical sensor configured to detect a state of an object which is to undergo processing by the household appliance. For example, in the case of the domestic appliance being a washing machine, sensor 16 may detect a state of the laundry inside the washing machine. Actuator control command 20 may be determined based on the detected state of the laundry.

FIG. 7 depicts a schematic diagram of control system 12 configured to control system 100 (e.g., manufacturing machine), such as a punch cutter, a cutter or a gun drill, of manufacturing system 102, such as part of a production line. Control system 12 may be configured to control actuator 14, which is configured to control system 100 (e.g., manufacturing machine).

Sensor 16 of system 100 (e.g., manufacturing machine) may be an optical sensor configured to capture one or more properties of manufactured product 104. Classifier 24 may be configured to determine a state of manufactured product 104 from one or more of the captured properties. Actuator 14 may be configured to control system 100 (e.g., manufacturing machine) depending on the determined state of manufactured product 104 for a subsequent manufacturing step of manufactured product 104. The actuator 14 may be configured to control functions of system 100 (e.g., manufacturing machine) on subsequent manufactured product 106 of system 100 (e.g., manufacturing machine) depending on the determined state of manufactured product 104.

FIG. 8 depicts a schematic diagram of control system 12 configured to control power tool 150, such as a power drill or driver, that has an at least partially autonomous mode. Control system 12 may be configured to control actuator 14, which is configured to control power tool 150.

Sensor 16 of power tool 150 may be an optical sensor configured to capture one or more properties of work surface 152 and/or fastener 154 being driven into work surface 152. Classifier 24 may be configured to determine a state of work surface 152 and/or fastener 154 relative to work surface 152 from one or more of the captured properties. The state may be fastener 154 being flush with work surface 152. The state may alternatively be hardness of work surface 152. Actuator 14 may be configured to control power tool 150 such that the driving function of power tool 150 is adjusted depending on the determined state of fastener 154 relative to work surface 152 or one or more captured properties of work surface 152. For example, actuator 14 may discontinue the driving function if the state of fastener 154 is flush relative to work surface 152. As another non-limiting example, actuator 14 may apply additional or less torque depending on the hardness of work surface 152.

FIG. 9 depicts a schematic diagram of control system 12 configured to control automated personal assistant 900. Control system 12 may be configured to control actuator 14, which is configured to control automated personal assistant 900. Automated personal assistant 900 may be configured to control a domestic appliance, such as a washing machine, a stove, an oven, a microwave or a dishwasher.

Sensor 16 may be an optical sensor and/or an audio sensor. The optical sensor may be configured to receive video images of gestures 904 of user 902. The audio sensor may be configured to receive a voice command of user 902.

Control system 12 of automated personal assistant 900 may be configured to determine actuator control commands 20 configured to control system 12. Control system 12 may be configured to determine actuator control commands 20 in accordance with sensor signals 18 of sensor 16. Automated personal assistant 900 is configured to transmit sensor signals 18 to control system 12. Classifier 24 of control system 12 may be configured to execute a gesture recognition algorithm to identify gesture 904 made by user 902, to determine actuator control commands 20, and to transmit the actuator control commands 20 to actuator 14. Classifier 24 may be configured to retrieve information from non-volatile storage in response to gesture 904 and to output the retrieved information in a form suitable for reception by user 902.

FIG. 10 depicts a schematic diagram of control system 12 configured to control monitoring system 1000. Monitoring system 1000 may be configured to physically control access through door 1002. Sensor 16 may be configured to detect a scene that is relevant in deciding whether access is granted. Sensor 16 may be an optical sensor configured to generate and transmit image and/or video data. Such data may be used by control system 12 to detect a person's face.

Classifier 24 of control system 12 of monitoring system 1000 may be configured to interpret the image and/or video data by matching identities of known people stored in non-volatile storage 26, thereby determining an identity of a person. Classifier 24 may be configured to generate and an actuator control command 20 in response to the interpretation of the image and/or video data. Control system 12 is configured to transmit the actuator control command 20 to actuator 14. In this embodiment, actuator 14 may be configured to lock or unlock door 1002 in response to the actuator control command 20. In other embodiments, a non-physical, logical access control is also possible.

Monitoring system 1000 may also be a surveillance system. In such an embodiment, sensor 16 may be an optical sensor configured to detect a scene that is under surveillance and control system 12 is configured to control display 1004. Classifier 24 is configured to determine a classification of a scene, e.g. whether the scene detected by sensor 16 is suspicious. Control system 12 is configured to transmit an actuator control command 20 to display 1004 in response to the classification. Display 1004 may be configured to adjust the displayed content in response to the actuator control command 20. For instance, display 1004 may highlight an object that is deemed suspicious by classifier 24. Utilizing an embodiment of the system disclosed, the surveillance system may predict objects in adversarial settings.

FIG. 11 depicts a schematic diagram of control system 12 configured to control imaging system 1100, for example an MRI apparatus, x-ray imaging apparatus or ultrasonic apparatus. Sensor 16 may, for example, be an imaging sensor. Classifier 24 may be configured to determine a classification of all or part of the sensed image. Classifier 24 may be configured to determine or select an actuator control command 20 in response to the classification obtained by the trained neural network. For example, classifier 24 may interpret a region of a sensed image to be potentially anomalous. In this case, actuator control command 20 may be determined or selected to cause display 1102 to display the imaging and highlighting the potentially anomalous region.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer-implemented method for training a neural network, comprising:

receiving a set of input data from one or more sensors, wherein the data includes time-series data, image data, video data, or sound data;

initializing a random perturbation sample associated with the set of input data;

for one or more iterations, executing one or more steps including:

computing a loss value associated with the random perturbation sample associated with the set of input data;

determining a gradient of the loss value associated with one or more parameters of the neural network;

updating, utilizing one or more machine learning optimizers, the one or more parameters in response to the gradient of the loss value associated with an intermediate-p robustness, wherein the intermediate-p robustness is an expectation of a p-norm of a loss, where $1<p<\infty$; increasing a level of perturbation stress applied to a new perturbation for one or more successive iterations; and in response to exceeding a first threshold associated with convergence of the neural network, outputting a trained neural network utilizing the updated parameters.

2. The computer-implemented method of claim 1, wherein the method includes utilizing Markov chain Monte Carlo to initialize the random perturbation sample.

3. The computer-implemented method of claim 1, wherein the neural network is further configured to execute a plurality of iterations of updating the one or more parameters utilizing the gradient prior to outputting the trained neural network.

4. The computer-implemented method of claim 1, wherein the trained neural network is configured to identify a random perturbation.

5. The computer-implemented method of claim 1, wherein a density associated with the random perturbation sample is a uniform distribution over a norm ball.

6. The computer-implemented method of claim 1, wherein the first threshold includes an amount of loss of the input data.

7. The computer-implemented method of claim 1, wherein the method includes increasing a level of perturbation stress for the random perturbation sample.

8. The computer-implemented method of claim 1, wherein the method includes utilizing perturbations associated with the set of the input data, wherein the perturbations are sampled utilizing Markov chain Monte Carlo for one or more iterations.

9. The computer-implemented method of claim 1, wherein the method includes evaluating an intermediate-p robustness for one or more perturbations utilizing an estimator.

10. A system including a machine-learning network, comprising:

a data storage interface configured to receive input data from a sensor, wherein the sensor includes a camera, a radar, a sonar, or a microphone;

a processor, in communication with the data storage interface, wherein the processor is programmed to:

receive the input data, wherein the input data is indicative of image, radar, sonar, or sound information;

initiate a random perturbation sample associated with the input data, wherein the random perturbation sample is derived from path sampling;

for one or more iterations, executing one or more steps including:

increase a level of perturbation stress for the random perturbation sample;

compute a loss value associated with the random perturbation sample;

determine a gradient of the loss value associated with one or more parameters of the neural network;

update the one or more parameters utilizing the gradient;

increasing a level of perturbation stress applied to a new perturbation to be utilized;

increasing a level and evaluate an intermediate-p robustness for one or more perturbations utilizing an estimator, wherein the intermediate-p robustness is an expectation of a p-norm of a loss, where $1<p<\infty$; and in response to exceeding a first threshold associated with convergence of the neural network, output a trained neural network utilizing updated parameters.

11. The system of claim 10, wherein the level of perturbation stress for the random perturbation sample is adjusted at each iteration.

12. The system of claim 10, wherein the level of perturbation stress for the random perturbation sample is increased at each iteration.

13. The system of claim 10, wherein the perturbations are sampled utilizing Markov chain Monte Carlo for one or more iterations.

14. The system of claim 10, wherein the first threshold includes a number of iterations.

15. A computer-program product in a computer comprising a non-transitory computer readable storage medium storing instruction, that when executed by the computer, cause the computer to:

for one or more iterations, update parameters associated with a machine-learning network utilizing perturbations for input data received from a sensor, wherein the sensor includes a camera, a radar, a sonar, or a microphone, and wherein the perturbations are sampled utilizing Markov chain Monte Carlo;

identify a loss value associated with each perturbation in each iteration;

evaluate the machine learning network by identifying an average loss value across each iteration and outputting the average loss value;

determine a gradient of the loss value associated with one or more parameters of the machine-learning network, the gradient of the loss value associated with an intermediate-p robustness, wherein the intermediate-p robustness is an expectation of a p-norm of a loss, where $1<p<\infty$; update the one or more parameters utilizing the gradient; and output a trained machine-learning network utilizing updated parameters and upon convergence to a first threshold.

16. The computer-program product in the computer of claim 15, wherein the machine-learning network is further configured to execute a plurality of iterations of updating the one or more parameters utilizing the gradient prior to outputting the trained machine-learning network.

17. The computer-program product in the computer of claim 15, wherein the trained machine-learning model is configured to identify a random perturbation.

18. The computer-program product in the computer of claim 15, wherein the first threshold includes an amount of loss of the input data.

19. The computer-program product in the computer of claim 15, wherein the first threshold includes a number of iterations.

* * * * *